United States Patent [19]

Graas

[11] Patent Number: 4,574,856
[45] Date of Patent: Mar. 11, 1986

[54] TREAD FOR A PNEUMATIC TIRE

[75] Inventor: Maurice Graas, Luxembourg, Luxembourg

[73] Assignee: The Goodyear Tire & Rubber Company, Akron, Ohio

[21] Appl. No.: 632,088

[22] Filed: Jul. 18, 1984

[51] Int. Cl.[4] .............................................. B60C 11/06
[52] U.S. Cl. .............................. 152/209 R; D12/142
[58] Field of Search ..................... 152/209 R, 209 D; D12/142, 144, 145

[56] References Cited

U.S. PATENT DOCUMENTS 4,057,089 11/1977 Johannsen ........................ 152/209 R
4,424,843 1/1984 Fontaine et al. ................ 152/209 R Primary Examiner—Michael Ball
Attorney, Agent, or Firm—L. R. Drayer

[57] ABSTRACT

A tread portion for an all season tire comprises a plurality of projecting elements defined by sets of zig-zag grooves. Preferably a central rib extends circumferentially about the tire. A set of primary zig-zag grooves extends generally axially inwardly from each axial edge of the tread. Each of the primary zig-zag grooves extends from the respective axial edge of the tread to the axially inner end of the groove in only one generally circumferential direction of the tire along its entire length. Sets of secondary zig-zag grooves extend generally axially outwardly from the axially innermost segments of the primary zig-zag grooves and intersect two or more primary zig-zag grooves, but do not intersect an axial edge of the tread.

9 Claims, 4 Drawing Figures

TREAD FOR A PNEUMATIC TIRE

BACKGROUND OF THE INVENTION

The present invention relates generally to pneumatic tires, more particularly to the tread portion of a pneumatic tire.

A pneumatic tire having a tread according to the present invention may be referred to as an all season tire. An "all season tire" is a tire with a tread portion adapted to provide good wet and snow traction while still maintaining good dry traction, tread wear, noise levels and handling. It is understood that in order to provide these desirable characteristics for an all season tire it is necessary to compromise the levels of some characteristics because, for example, a tread portion that provides a very good level of wet traction or snow traction performance generally has poorer dry traction, handling and/or noise levels.

A pneumatic tire having a tread portion according to the present invention is suitable for use in all seasons of the year and provides good wet and snow traction while still maintaining good dry traction, tread wear, noise levels, and handling.

DETAILED DESCRIPTION OF THE INVENTION

Figure 1:
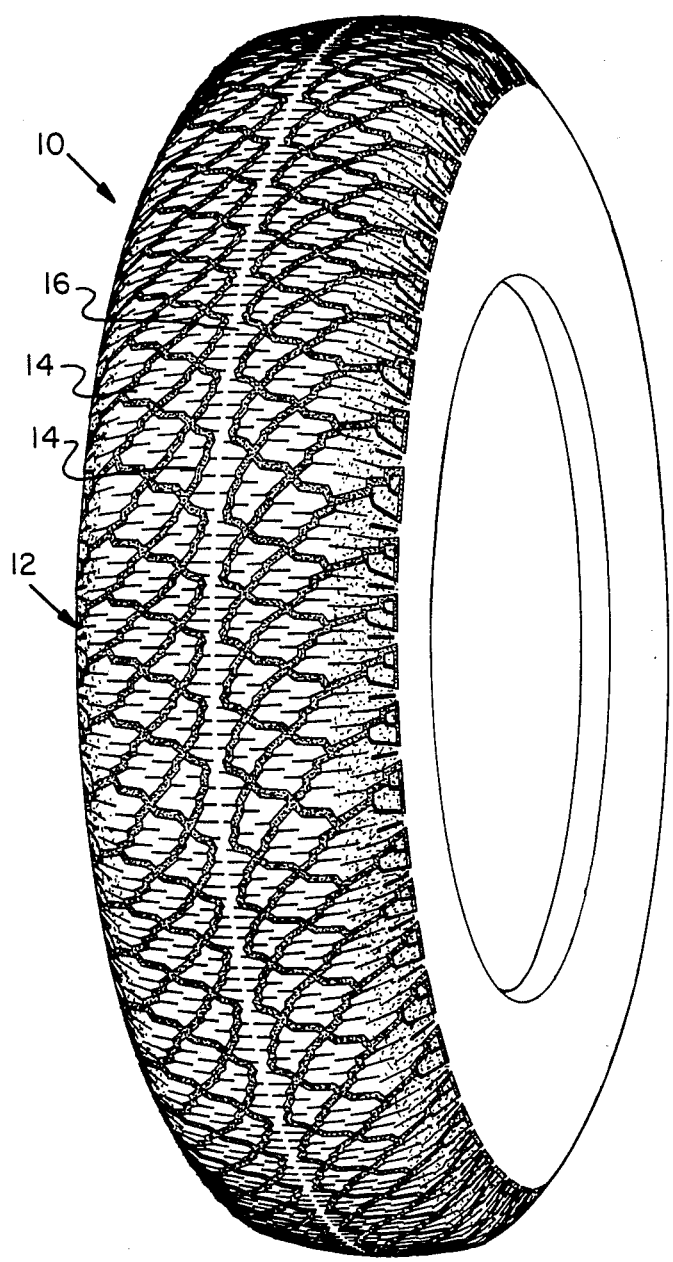
FIG. 1 is a perspective view of a pneumatic tire having a tread portion made in accordance with the preferred embodiment of the present invention.
Figure 2:
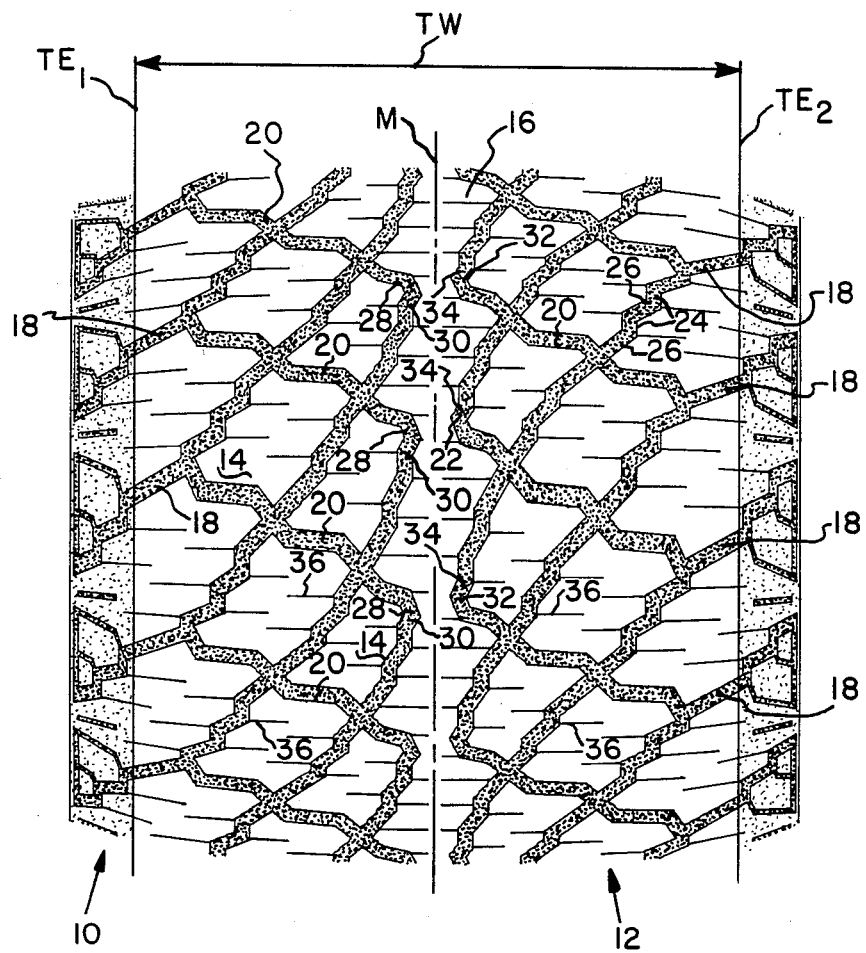
FIG. 2 is a fragmentary plan view of the tread portion of the tire of FIG. 1.
Figure 3:
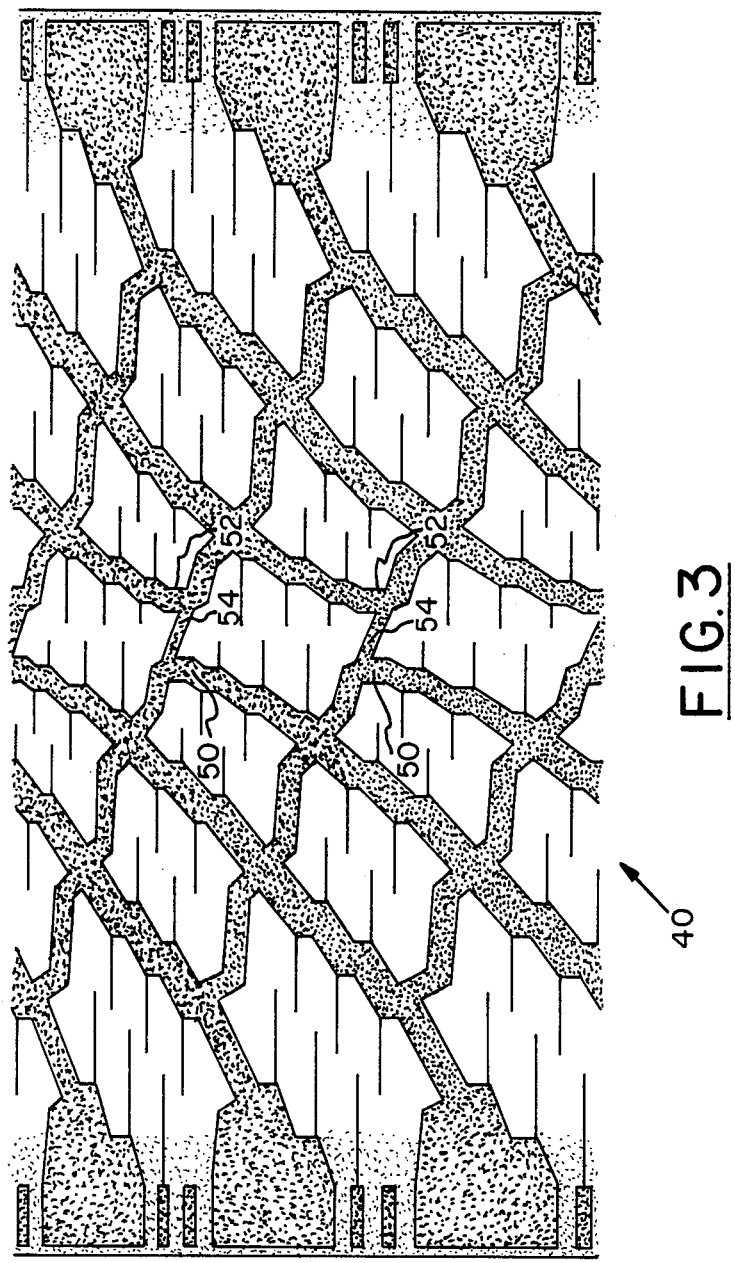
FIG. 3 is a fragmentary plan view of the tread portion of a pneumatic tire in accordance with an alternative embodiment of the present invention.
Figure 4:
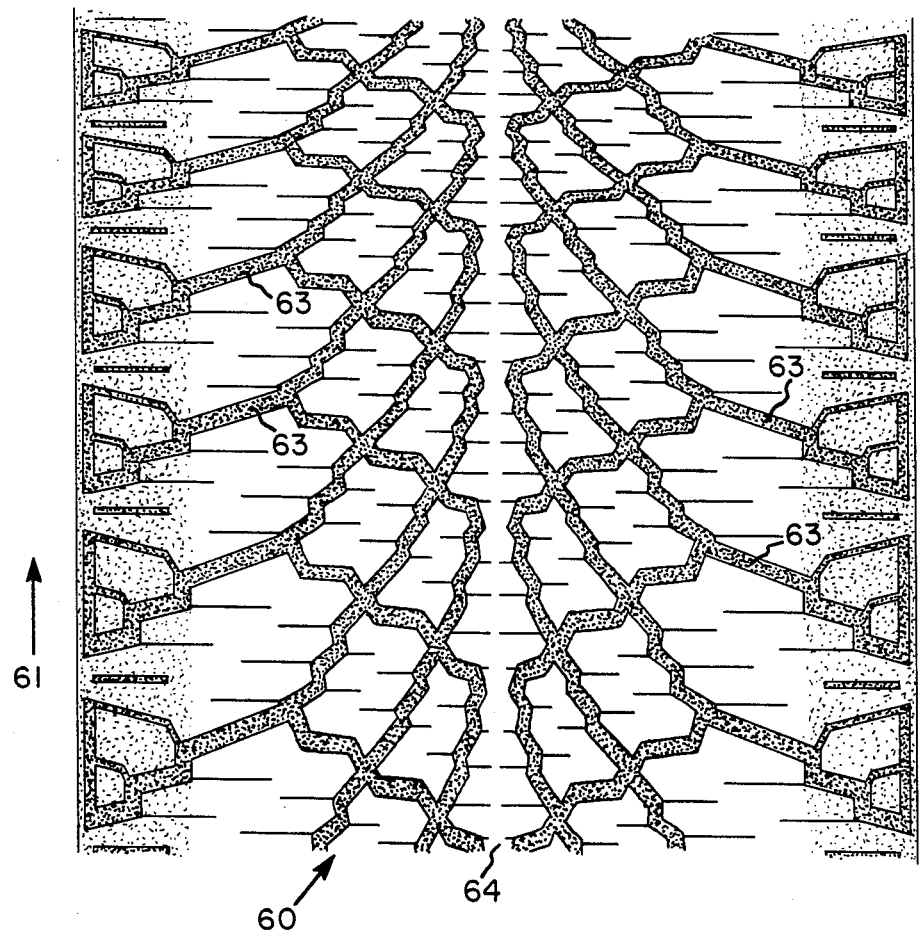
FIG. 4 is a fragmentary plan view of the tread portion of a pneumatic tire in accordance with another alternative embodiment of the present invention.

Referring to the drawing, there is illustrated in FIG. 1 a perspective view of a pneumatic tire 10 having a tread portion 12 manufactured in accordance with the preferred embodiment of the present invention. FIG. 2 is a fragmentary plan view of the tread portion 12 of the pneumatic tire 10 of FIG. 1. The invention may be most advantageously practiced if the pneumatic tire is a radial tire intended for use on a passenger car, but the invention also applies to truck and bus tires. It is understood that the tread portion extends circumferentially about the tire and comprises a plurality of independent projections or buttons 14, and in the preferred embodiment a continuous rib 16 that extends circumferentially about the tread portion and contains the mid-circumferential plane of the tire. In one alternative embodiment of the invention, as illustrated in FIG. 3, the continuous rib 16 is replaced by a circumferentially extending series of independent projections or buttons. In a second alternative embodiment of the invention, as illustrated in FIG. 4, the tire has a directional tread structure. For the purposes of this invention, an independent projection or button shall be understood to mean a projection which has a circumferential length and an axial width that are each substantially less than one-half the width of the footprint of the tire. For the purposes of this invention, a rib is continuous if it is without any axial breaks, that is, without any notches, slits, blading or other features which extend continuously axially across the rib.

The shape of independent projections 14 and the continuous rib 16 are defined by a number of zig-zag grooves in the tread portion. The system of grooves comprises primary zig-zag grooves 18 and secondary zig-zag grooves 20.

Each primary zig-zag groove 18 comprises a series of straight segments communicating with next adjacent segments and oriented at angular relationships with the next adjacent segments. The segments have widths such that the primary zig-zag grooves remain open in a footprint of the tire. It is understood that as used herein a footprint, and of course the tread of the claimed tire, is evaluated when a tire is mounted upon the specified rim, inflated to its design inflation pressure and then subjected to the rated load. The tread portion has first and second sets of circumferentially spaced apart primary zig-zag grooves. Each groove of the first set of primary zig-zag grooves extends generally axially inwardly from a first axial edge $TE_1$ of the tread, but does not intersect the mid-circumferential plane M of the tire. Each groove of the second set of primary zig-zag grooves extends generally axially inwardly from a second axial edge $TE_2$ of the tread, but does not intersect the mid-circumferential plane M of the tire. As used herein, "generally axially" refers to a direction that is not parallel to the axis of rotation of a tire, but is a direction going away from a tread edge which will eventually intersect the mid-circumferential plane of the tire, or vice-versa. Preferably the circumferential spacing between primary zig-zag grooves at the respective axial edge of the tread is in the range of 20 to 40 mm, or put another way about 20 to 40% of the tread width. As used herein the tread width TW is the axial distance between the axial edges of the tread $TE_1$ and $TE_2$ as measured from the footprint of a tire. As used herein "axial" and "axially" refer to directions that are parallel to the axis of rotation of a tire, and the "mid-circumferential plane" of a tire is a plane that is perpendicular to a tire's axis of rotation and is equidistant from the axial edges of the tread in a tire's footprint.

Each primary zig-zag groove 18 has an axially inner end 22 that is located an axial distance of not more than 15% of the tread width TW away from the mid-circumferential plane M of the tire. Preferably the axially inner edge of each primary zig-zag groove is located an axial distance of between 3 to 12% of the tread width away from the mid-circumferential plane of the tire. Every other segment 24 of each primary zig-zag groove 18 is oriented at between 0° and 5° with respect to the mid-circumferential plane M, preferably at 0°. The remaining segemts 26 of each primary zig-zag groove are oriented at angles of greater than 0° but not greater than 90° with respect to the mid-circumferential plane, with the angular orientation of said remaining segments with respect to the mid-circumferential plane progressively decreasing as the axial distance between said remaining segments and said mid-circumferential plane decreases. The primary zig-zag grooves therefor extend from the respective tread edge towards the mid-circumferential plane at a nominal angle in the range of 10° to 30°, preferably 12° to 25°, with respect to the mid-circumferential plane.

Each groove 18 of said first and second sets of primary zig-zag grooves extends from the respective axial edge of the tread to the axially inner end of the groove in only one generally circumferential direction along its entire length. As used herein, a circumferential direction is a direction in which the tire rotates about its axis, and a "generally circumferential direction" means a direction that would eventually go completely around the axis of rotation but also extends axially with respect to the tire.

Each secondary zig-zag groove 20 comprises a series of straight segments communicating with next adjacent segments and oriented at angular relationships with adjacent segments. The segments have widths such that the secondary zig-zag grooves remain open in a footprint of the tire. Each groove of a first set of secondary zig-zag grooves has an axially innermost segment 28 that intersects the axially innermost segment 30 of one of the grooves of said first set of primary zig-zag grooves. Each groove of said second set of secondary zig-zag grooves has an axially innermost segment 32 that intersects the axially innermost segment 34 of one of the grooves of said second set of primary zig-zag grooves. Each secondary zig-zag groove extends generally axially outwardly from its axially innermost segment and intersects a plurality, preferably four, primary zig-zag grooves, but does not intersect an axial edge of the tread. Portions of at least two segments of each secondary zig-zag groove are located between each pair of circumferentially next adjacent primary zig-zag grooves that a secondary zig-zag groove intersects. The secondary zig-zag grooves are oriented at a nominal angle of 40° to 80°, preferably 45° to 75°, with respect to the mid-circumferential plane of the tire.

The zig-zag configuration of the grooves provides a tire that has good traction on wet or snow covered surfaces, along with good wet skid characteristics. The varying angular orientation of said remaining segments of the primary zig-zag grooves, as a function of the distance of the remaining segments from the mid-circumferential plane provides noise levels that are very acceptable by increasing the stiffness of the leading edges of the independent projections as they enter the footprint of the tire and minimizing impact noise.

As shown in FIGS. 1 and 2, it is preferred that the first and second sets of primary zig-zag grooves be separated from one another by a continuous rib 16 extending circumferentially about the tread portion and containing the mid-circumferential plane 16. This center rib embodiment of the invention is preferred because it aids in noise abatement and improves the performance of the tire under a variety of operating conditions. However, as illustrated in FIG. 3, in a tire tread portion 40, according to an alternative embodiment, the axially inner segment 50 of each groove of the first set of primary zig-zag grooves communicates with the axially inner segment 52 of a groove of the second set of primary zig-zag grooves by means of a connecting groove 54. In all other respects the tire tread portion 40 shown in FIG. 3 is substantially the same as that shown in FIGS. 1 and 2.

In order to obtain the most efficient evacuation of water, mud or snow from the footprint of a tire according to the invention, the tread portion should have a net to gross ratio in the range of 60% to 80%, preferably 65% to 75%. Net to gross ratio is understood to mean the ratio between the area of a tread portion that is in actual contact with the ground and the total gross area of the tire footprint.

Referring once again to FIGS. 1 and 2, it may be observed that the tread portion of a tire according to the invention may have a plurality of narrow slits 36 therein. These narrow slits are sometimes referred to as blades or sipes, and have a width such that the slits are closed in a footprint of the tire. Each narrow slit 36 intersects the vertex of a projecting angle of one of the primary zig-zag grooves. The slits extend either axially or generally axially, but do not extend across the entire width of an independent projection or rib. The narrow slits may be incorporated in a tread portion to provide some flexibility to the independent projections and/or the center rib, while the zig-zag grooves make the leading edges of the independent projections stiff for noise abatement and traction purposes.

Both the preferred embodiment illustrated in FIGS. 1 and 2, and the alternate embodiment illustrated in FIG. 3 are non-directional tires, that is to say tires that will operate the same regardless of the direction in which they are rotated. Tires according to these embodiments have the grooves of the first set of primary zig-zag grooves inclined with respect to the mid-circumferential plane in one circumferential direction, and the grooves of the second set of primary zig-zag grooves inclined with respect to the mid-circumferential plane in the opposite circumferential direction. That is to say, in a tire having a non-directional tread according to the invention the grooves of the first set of primary zig-zag grooves extend in a first generally circumferential direction from the first axial edge TE of the tread to the axially inner ends of the grooves, and the grooves of said second set of primary zig-zag grooves extend in a second generally circuaferential direction from the second axial edge $TE_2$ of the tread to the axially inner ends of the grooves, with the first generally circumferential direction being opposite to the second generally circumferential direction.

FIG. 4 is a fragmentary plan view of the tread portion 60 of a directional tire manufactured according to the invention. A directional tire is a tire that will operate differently depending upon the direction in which it is rotated. For example, the tire illustrated in FIG. 4 is intended to perform most favorably when rotated in the direction indicated by the arrow 61 in the figure. A directional tire may be desired, for example, when the tire is intended to be used primarily on snow covered highways. Put another way, in a directional tire 60 according to the invention all of the grooves of both the first and second sets of primary zig-zag grooves extend in the same generally circumferential direction from the respective axial edges of the tread to the axially inner ends of the grooves. While the directional embodident illustrated in FIG. 4 has a continuous rib 64 extending circumferentially about the tread portion and containing the mid-circumferential plane, it is understood that the primary zig-zag grooves of the two sets could be interconnected in a manner like that illustrated in FIG. 3 also. The other features of the invention disclosed with respect to the other embodiments may be employed in a directional tire as well.

While certain representative embodiments and details have been shown for the purpose of illustrating the invention, it will be apparent to those skilled in the art that various changes and modifications may be made therein without departing from the invention.

What is claimed is:
1. A pneumatic tire comprising a tread portion having independent projections defined by:
(a) first and second sets of circumferentially spaced apart primary zig-zag grooves, each primary zig-zag groove comprising a series of straight segments communicating with next adjacent segments and oriented at angular relationships with next adjacent segments, said segments having widths such that the primary zig-zag grooves remain open in a footprint of the tire, each groove of said first set of primary zig-zag grooves extending generally axially inwardly from a first axial edge of the tread but not intersecting a mid-circumferential plane of the tire, each groove of said second second set of primary zig-zag grooves extending generally axially inwardly from a second axial edge of the tread but not intersecting the mid-circumferential plane of the tire, each primary zig-zag groove having an axially inner end that is located an axial distance of not more than 15% of the tread width away from the mid-circumferential plane of the tire, each groove of said first and second sets of primary zig-zag grooves extending from the respective axial edge of the tread to the axially inner end of the groove in only one generally circumferential direction along its entire length, every other segment of each primary zig-zag groove being oriented at between 0° and 5° with respect to said mid-cirumferential plane and the remaining segments of each primary zig-zag groove being oriented at angles of greater than 0° but no greater than 90° with respect to said mid-circumferential plane, the angular orientation of said remaining segments with respect to said mid-circumferential plane progressively decreasing as the axial distance between said remaining segments and said mid-circumferential plane decreases;

(b) first and second sets of circumferentially spaced apart secondary zig-zag grooves, each secondary zig-zag groove comprising a series of straight segments communicating with next adjacent segments and oriented at angular relationships with adjacent segments, said segments having widths such that the secondary zig-zag grooves remain open in a footprint of the tire, each groove of said first set of secondary zig-zag grooves having an axially innermost segment that intersects the axially innermost segment of one of the grooves of said first set of primary zig-zag grooves, each groove of said second set of secondary zig-zag grooves having an axially innermost segment that intersects the axially innermost segment of one of the grooves of said second set of primary zig-zag grooves, each secondary zig-zag groove extending generally axially outwardly from its axially innermost segment and intersecting four primary zig-zag grooves but not intersecting an axially edge of said tread, and portions of at least two segments of each secondary zig-zag groove being located between each pair of circumferentially next adjacent primary zig-zag grooves that the secondary zig-zag groove intersects; and (c) a plurality of axially or generally axially extending narrow slits having widths such that said slits are closed in a footprint of the tire, each said narrow slit intersecting a vertex of a projecting angle of one of said primary zig-zag grooves, said slits not extending across the entire width of any indpendent projection or rib.

2. A pneumatic tire according to claim 1 wherein all of the grooves of both said first and second sets of primary zig-zag grooves extend in the same generally circumferential direction from the respective axial edges of the tread to the axially inner ends of the grooves.

3. A pneumatic tire according to claim 1 wherein the grooves of said first set of primary zig-zag grooves extend in a first generally circumferential direction from the first axial edge of the tread to their axially inner ends, and the grooves of said second set of primary zig-zag grooves extend in a second generally circumferential direction from said second axial edge of the tread to their axially inner ends, said second generally circumferential direction being opposite to said first generally circumferential direction.

4. A pneumatic tire according to any one of claims 1, 2 or 3 wherein each of said every other segment of each primary zig-zag groove is oriented at 0° with respect to said mid-circumferential plane.

5. A pneumatic tire according to any one of claims 1, 2 or 3 wherein said first and second sets of primary zig-zag grooves are separated from one another by a continuous rib extending circumferentially about the tread portion and containing said mid-circumferential plane.

6. A pneumatic tire according to any one of claims 1, 2 or 3 wherein the axially innermost segment of each groove of said first set of primary zig-zag grooves communicates with the axially innermost segment of a groove of said second set of primary zig-zag grooves by means of a connecting groove.

7. A pneumatic tire according to any one of claims 1, 2 or 3 wherein said tread portion has a net to gross ratio in the range of 60 to 80%.

8. A pneumatic tire according to claim 5 wherein said tread portion has a net to gross ratio in the range of 60 to 80%.

9. A pneumatic tire according to claim 1 wherein said first and second sets of primary zig-zag grooves are separated from one another by a continuous rib extending circumferentially about the tread portion and containing said mid-circurferential plane.

* * * * *

UNITED STATES PATENT AND TRADEMARK OFFICE
CERTIFICATE OF CORRECTION

PATENT NO. : 4,574,856

DATED : March 11, 1986

INVENTOR(S) : Maurice Graas

It is certified that error appears in the above-identified patent and that said Letters Patent is hereby corrected as shown below:

Column 2, line 53, delete "segemts" and replace therewith --segments--.

Column 4, line 30, delete "circuaferential" and replace therewith --circumferential--.

Signed and Sealed this

Eleventh Day of November, 1986

Attest:

DONALD J. QUIGG

*Attesting Officer*  *Commissioner of Patents and Trademarks*